United States Patent [19]

Chaffanjon

[11] Patent Number: 6,069,556
[45] Date of Patent: May 30, 2000

[54] INTERFACE DEVICE BI-DIRECTIONAL CONNECTION OF CURRENTS CARRYING LOW VOLTAGE/RADIOFREQUENCY

[75] Inventor: Daniel Chaffanjon, Montgeron, France

[73] Assignee: Electricite de France, Paris, France

[21] Appl. No.: 09/284,507

[22] PCT Filed: Oct. 13, 1997

[86] PCT No.: PCT/FR97/01824

§ 371 Date: Apr. 14, 1999

§ 102(e) Date: Apr. 14, 1999

[87] PCT Pub. No.: WO98/17013

PCT Pub. Date: Apr. 23, 1998

[30] Foreign Application Priority Data

Oct. 15, 1996 [FR] France .................................. 96 12562

[51] Int. Cl.[7] .............................................. H04M 11/04
[52] U.S. Cl. ........................... 340/310.06; 340/310.02; 455/3.3; 455/76
[58] Field of Search .................... 340/310.01–310.06; 455/76, 3.3

[56] References Cited

U.S. PATENT DOCUMENTS

| 4,556,864 | 12/1985 | Roy .................................... 340/310.01 |
| 4,589,075 | 5/1986 | Buennagel ............................. 364/492 |
| 4,749,992 | 6/1988 | Fitzemeyer et al. ............... 340/870.02 |
| 4,885,564 | 12/1989 | Vercellotti et al. ............... 340/310.06 |
| 5,477,091 | 12/1995 | Fiorina et al. ..................... 340/310.01 |

FOREIGN PATENT DOCUMENTS

| 0 128 416 A2 | 12/1984 | European Pat. Off. . |
| 0 714 193 A2 | 5/1996 | European Pat. Off. . |

OTHER PUBLICATIONS

Hidemoto; Patent Abstracts of Japan; Pub. No. 03062631, Pub. Date Mar. 18, 1991.

*Primary Examiner*—Daniel J. Wu
*Attorney, Agent, or Firm*—Larson & Taylor

[57] ABSTRACT

The invention concerns an interface device of bi-directional connection of current carrying low voltage/radio frequency. It includes a module for coupling currents carrying low voltage/radio frequency delivering in reception signals (rcp) representing reception of carrier currents, a first channel of currents carrying low voltage/radio frequency delivering a signal modulating radio frequency transmission (sme). A coupling device receives in transmission the modulating signal for transmitting a radio frequency signal (srfe) representing the carrier currents, and, in reception, a reception radio frequency signal (srfr) transmitted to a second channel of currents carrying low voltage/radio frequency. The second channel delivers signals (ecp) representing the carrier currents in transmission to the module for transmission of the low voltage line. The invention is useful for house automation and for managing subscriber services.

9 Claims, 9 Drawing Sheets

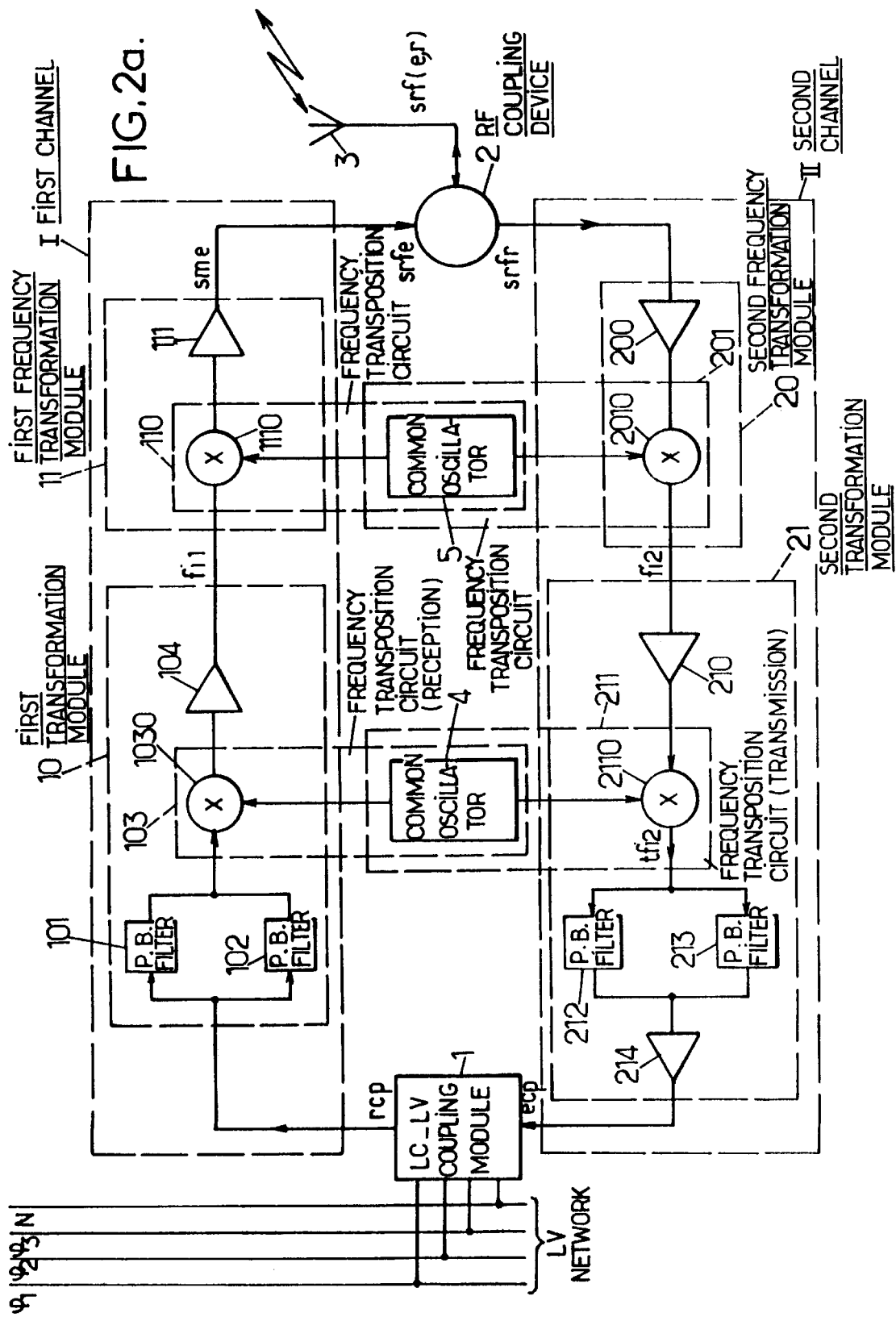

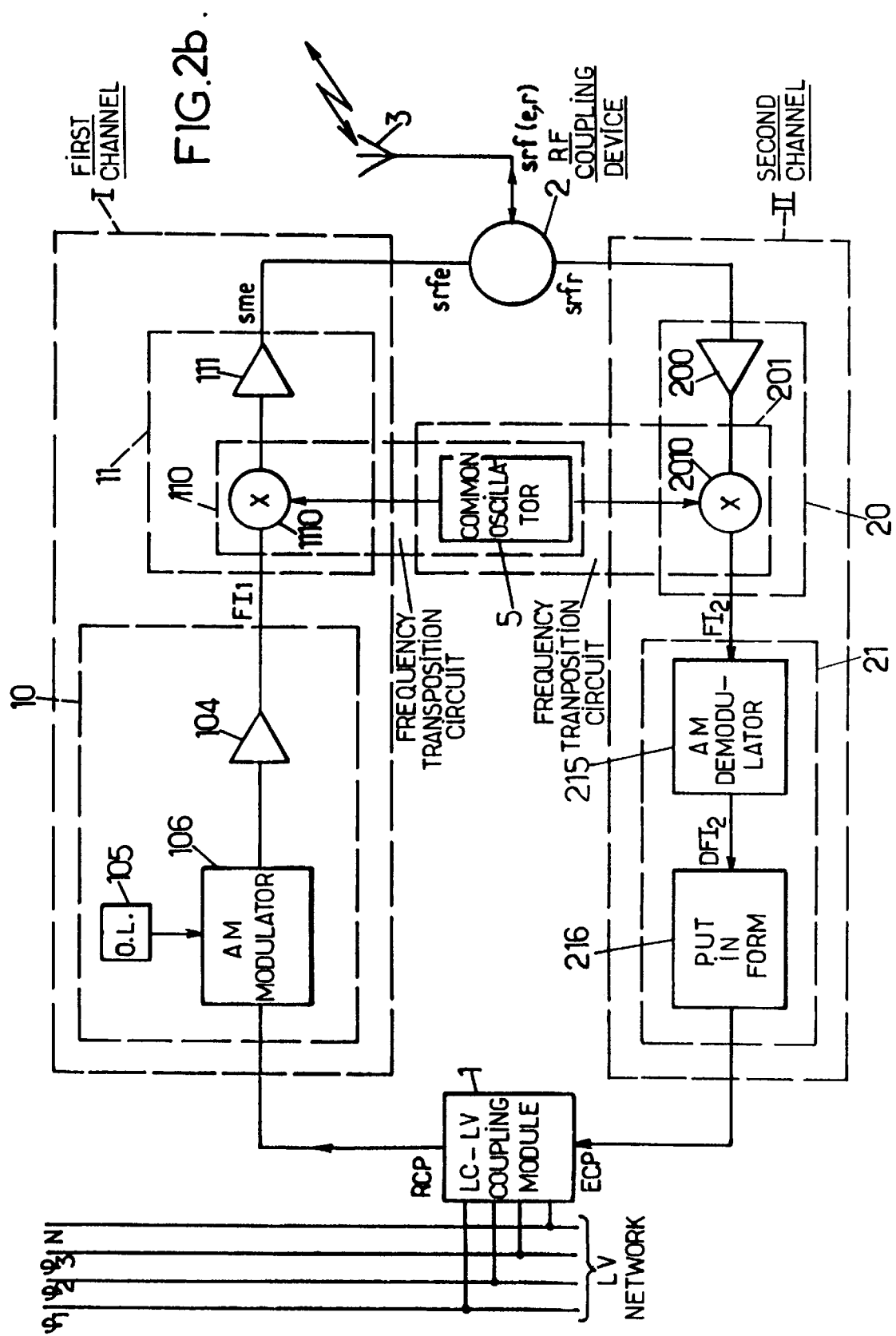

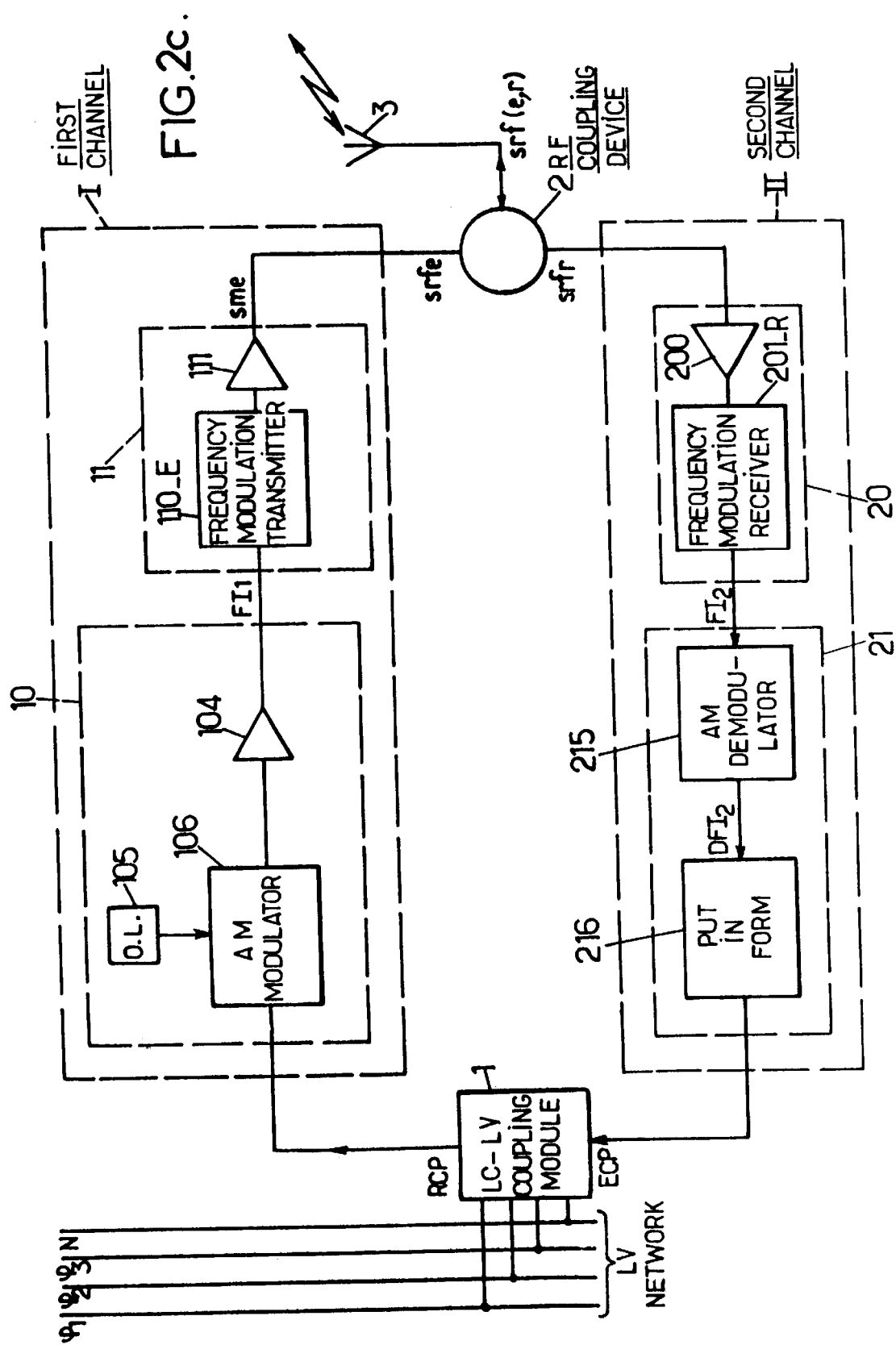

INTERFACE DEVICE BI-DIRECTIONAL CONNECTION OF CURRENTS CARRYING LOW VOLTAGE/RADIOFREQUENCY

BACKGROUND OF THE INVENTION

The invention concerns an interface device for a bi-directional low voltage/radio frequency carrier LC-LV connection between a low voltage electrical energy distribution line, enabling the transmission of signals by carriers, and radio space.

At present, the transmission of messages such as management messages by carriers on a low voltage electrical energy distribution network, LV network, with the view to ensuring the management of different services to which clients subscribed to this electrical energy distribution network have access, is more and more used, on account, on the one hand, of the pre-existence of access to electrical energy distribution installations, and, on the other hand, of the potential growth at least of these types of services likely to be offered.

In a general way, a concentrator device is provided, as shown in an illustrative manner in FIG. 1a, for a branch of the low voltage electrical energy distribution network, running from the HV/LV transformer for example.

This concentrator device connected through a telephone connection for example with a management center, enables management messages to be sent on the LV network according to a credit repetition process. The installations of each subscriber involved with the services are equipped with a Clientele Communicating Interface circuit, I.C.C. circuit, branched between one of the phase conductors and the network neutral. The management messages, transmitted for example by the concentrator, on a call from the management center, in a semi-interactive mode, are propagated, in correct reception conditions on the LV network, over a distance not exceeding about 200 to 300 meters. For this reason, the transmission process of the management messages is composed of a repetition process with credit repetition, every I.C.C. circuit receiving from the upstream, i.e. from the commutator itself or from the upstream I.C.C. circuit, a management message which is not intended for it carrying out a decrementation of one unit of the credit repetition then a retransmission of the received message, with a decremented credit repetition. This process, ensuring a transmission in waves of different management messages, such as shown in an illustrative way in FIG. 1b. allows in this way every I.C.C. circuit to be reached, whatever its position on the LV network. The credit repetition is for example carried to zero when the specified management address message has reached the I.C.C. circuit of corresponding specified address, and the initial credit repetition allocated by the concentrator is chosen as a function of the equipment configuration of the LV network and of specific security criteria allowing the repetition by the concentrator of the management message provided from its credit repetition.

In the aforesaid current technical state of the art, the throughput rate of transmitted data, i.e. the management messages, is 300 bits/second. Such a transmission rate allows temporarily slowing the data frame, carriers of these messages, to the frequency of the LV network, 50 Hz, whatever the phase conductor on which an I.C.C. circuit is branched.

The transmission mode is of the bi-directional half-duplex transmission half-duplex carrier type at 61 kHz and at 74 kHz respectively, each representing respectively the binary value of 0 and 1.

It then follows that for a repetition, all the bits are transmitted in a synchronous way. The 61 and 74 kHz carriers cannot however be synchronized. The initiative of the exchange is due at the present time to the single concentrator. The response of the addressee I.C.C. circuit gets, in the same way as the concentrator-I.C.C. circuit call, the repetition with the same credit repetition value. For the data frames the duration of which is of the order of one second and takes account of an initial credit repetition of the order of 3 or 4, it can be estimated that the duration of a management message exchange between the concentrator and a given I.C.C. circuit is of the order of 10 to 12 seconds.

For a more detailed description of the characteristics of carrier signals, LC-LV signals, the European standard EN 50065-1 can be usefully referred to. By reference to the aforementioned standard, it is simply indicated that the type of modulation used by the low frequency carriers at 61 kHz and 74 kHz is the SFSK modulation, for Spread Frequency Shift Keying, this type of modulation being included as an FSK modulation mode for which the spectral lines are sufficiently distant from each other to avoid the disturbance of one by a noise or interference in practice being able to reach the other. In such a case, the receiver processes the undisturbed line as if it was a simple transmission in O-O-K mode for ON-OFF KEYING.

Thus, a one logic is shown by the presence of the low frequency carrier at 61 kHz and the absence of the low frequency carrier at 74 kHz, and a zero logic by the absence of the low frequency carrier at 61 kHz and the presence of the low frequency carrier at 74 kHz.

The aforementioned operating mode gives satisfaction. However, it has an obvious limitation, insofar as the line equipment of the LV network, in concentrators being mainly reserved to the lines having a sufficient density of subscribed clients is concerned. It is hardly ever conceivable to ensure a generalization and an extension of the provision of services whatever the size of the LV network and the subscribed client density on this LV network.

SUMMARY OF THE INVENTION

The object of the present invention is to remedy the aforementioned drawbacks by using an interface device for a bi-directional low voltage/radio frequency carrier LC-LV connection between a low voltage electrical energy distribution line, allowing the transmission of signals by carriers, and the radio space in a way to allow the extension of the management messages transmission from a low voltage network to one or more low voltage networks and the generalization and extension of the corresponding service provisions.

Another object of the present invention is to use an interface device for a bi-directional LC-LV/radio frequency connection allowing the synchronous transmission of data transmitted in the form of carriers from a first to a second LV network, separate or otherwise from the first LV network.

The interface device for a bi-directional low voltage/radio frequency carrier LC-LV connection between a low voltage electrical energy distribution line, allowing the transmission of carrier signals, and the radio space, the object of the present invention, is remarkable in that it includes an LC-LT coupling circuit interconnected to the low voltage line and allowing to deliver, during reception, first signals representative of information during reception of carriers, a first low voltage/radio frequency carrier channel including at least first transformation circuits of the first signals representative of the information during reception of the carriers of a first intermediate frequency signal amplitude modulated by these first signals representative of the information during reception of these carriers and of first transposition circuits at the frequency of the first intermediate frequency signal into a radio frequency transmission modulation signal. A coupling and transmission-receiver device to the first frequency transformation circuits is interconnected to the first frequency transformation circuits and receives, on the one hand, during transmission, the radio frequency transmission modulation signal in order to produce the transmission of a radio frequency signal representative of the carrier information, and, on the other hand, during reception, a radio frequency reception signal. A second radio frequency/low voltage carrier channel is interconnected to the transmission-reception coupling device and includes at least second frequency transformation circuits of the reception radio frequency signal into a second intermediate frequency signal, with the same frequency as that of the first intermediate frequency signal, and second transformation circuits of the second intermediate frequency signal into second signals representative of information during transmission of the carriers. The second transformation circuits are interconnected and deliver the second signals representative of information during transmission of the carriers to the LC-LT coupling circuit, for transmission of this data in the form of carriers on the low voltage line.

It finds application in the management of low voltage electrical energy distribution networks, as well as, in a more general way, in the provision of services of every kind in the home automation field.

BRIEF DESCRIPTION OF THE DRAWINGS

It will be understood better by reading the description below, in connection with the drawings in which, as well as FIGS. 1a and 1b relating to the prior art:

FIG. 2a shows, in the form of a functional diagram, an interface device for a bi-directional low tension/radio frequency carrier connection, the object of the invention, in a first embodiment mode;

FIG. 2b shows, in a functional diagram, an interface device for a bi-directional low tension/radio frequency carrier connection, the object of the present invention, in a second embodiment mode;

FIG. 2c shows a simplified variant of the second embodiment mode shown in FIG. 2b;

DETAILED DESCRIPTION OF THE PREFERRED EMBODIMENTS

Figure 1A:
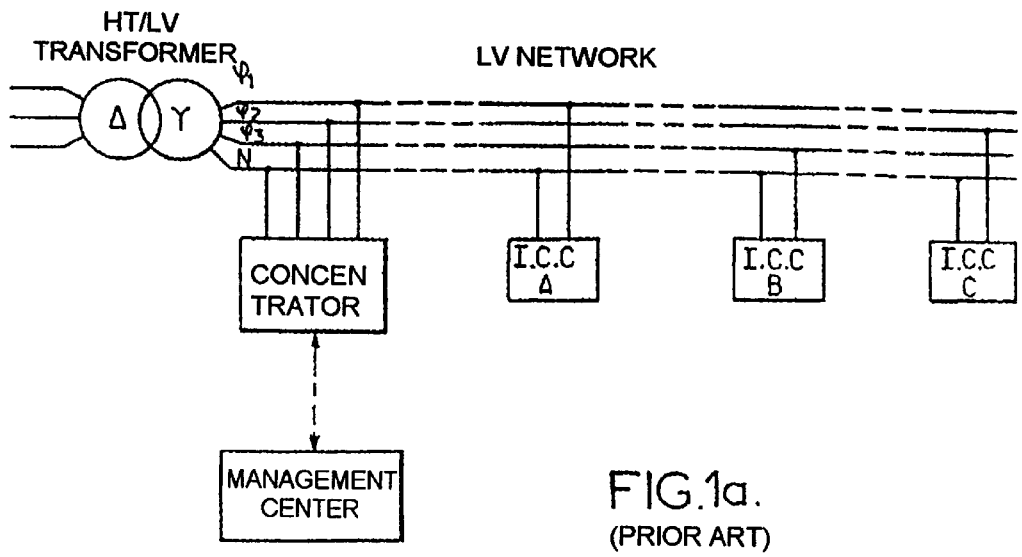
Figure 1B:
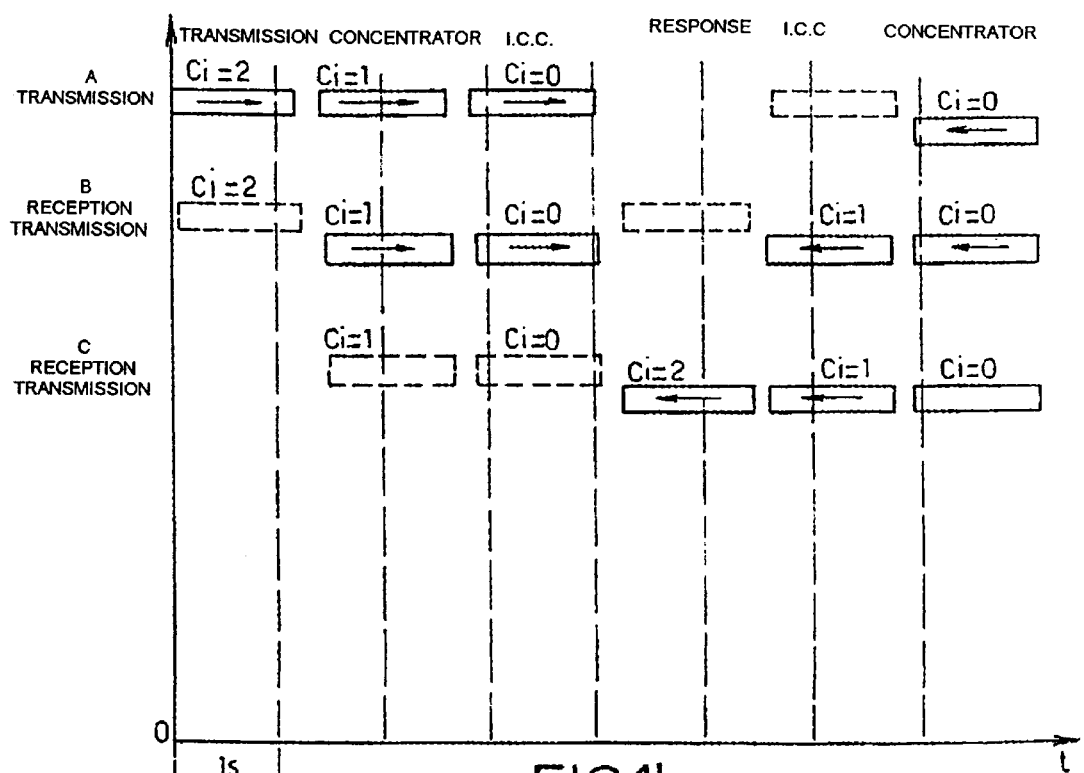

A more detailed description of the interface device for a bi-directional low voltage/radio frequency carrier LC-LV connection between a low voltage electrical energy distribution line, seat of the transmission of signals by carrier and the radio space, will be first given, on the one hand, in a general framework, and, on the other hand, in the framework of a first advantageous embodiment mode in connection with FIG. 2a.

As shown in aforementioned figure, the interface device, the object of the present invention, includes a LC-LV coupling module 1 interconnected to the low voltage LV line, this coupling module allowing during reception first representative signals of information during reception of carriers propagating on the low voltage LV line. The first representative signals of information during reception of carriers are marked rcp in FIG. 2a. In the standard way, it is indicated that the LC-LV coupling module 1 is a coupling module available in stores such as the coupling module integrated into the I.C.C. circuits previously mentioned in the description. In this example, the coupling module 1 will not be described in detail.

Besides the aforementioned LC-LV coupling module, the interface module according to the invention includes a first channel, designated by low voltage/radio frequency carrier channel, this channel being marked 1 in FIG. 2a and comprising at least a first transformation module 10 of the first representative signals of the information during reception of the carriers rcp into a first intermediate frequency signal, marked fi, in the aforementioned figure. In a general way and in order to facilitate the reading of the description in connection with the drawings, and in particular FIG. 2a, it has been indicated that all the different components carrying a reference of which the first number starts with 1 but of greater value than 1, belongs to the first channel.

The first intermediate frequency signal $fi_1$ is amplitude modulated by the first representative signals of the information during reception of the carriers rcp.

Moreover, the first channel I also includes a first frequency transposition module 11 of the first intermediate frequency $fi_1$ in a radio frequency transmission modulation signal, marked sme in the aforementioned FIG. 2a.

The aforementioned first channel I is moreover coupled to a radio frequency transmission-reception coupling device 2, this radio frequency transmission-reception coupling device 2 being in fact interconnected to the first frequency transposition module 11 in order to receive, on the one hand, during transmission, the aforementioned radio frequency transmission modulation signal sme delivered by the first frequency transposition module 11, in order to carry out in this way the transmission of a radio frequency signal, marked srfe, representative of the information of the carriers.

Moreover, as symbolized by the double arrow in one of the ports of the radio frequency transmission-reception coupling device 2, this receiving on the other hand, during reception, a radio frequency reception signal, marked srfr, the representative radio frequency signal, on the one hand, in the transmission of the carrier information and, on the other hand, during reception of radio frequency reception information, being for the convenience of the notation, globally marked srf(e,r).

As has been shown in FIG. 2a, the interface device, the object of the present invention, includes besides, interconnected to the previously quoted transmission-reception coupling device 2, a second channel, designated by radio frequency/low voltage carrier channel, this second channel being marked II and receiving the previously mentioned radio frequency reception signal srfr.

The second channel II comprises at least, as shown in FIG. 2a, a second frequency transposition module 20 of the radio frequency reception signal srfr into a second intermediate frequency signal, marked $fi_2$, this second intermediate frequency signal having by preference the same frequency value as that of the first intermediate frequency signal $fi_1$.

Moreover, the second channel II includes a second transformation module 21 of the second intermediate frequency signal $fi_2$ into second representative signals of information during transmission of the carriers, these second signals being marked ecp in FIG. 2a.

Indeed, the second transformation module 21 of the second intermediate frequency signal is interconnected to the LC-LV coupling module 1 in order to deliver to this latter the second representative signal of the information during transmission of the carriers ecp previously quoted, in order to allow the transmission of this data in the form of carriers by the LC-LV coupling module on the low voltage line LV. It is indicated also that all the constituent components of the second channel II carry a reference for which the first number starts with the number 2 and for which the range is greater than 2.

The effective composition of the first channel I and of the second channel II, as well as their constituent modules, first transformation module 10 of the first representative signals of the information during reception of the carriers, first frequency transposition module 11 and of the second channel II and of its constituent components, second frequency transposition module 20, and second transformation module 21 of the second intermediate frequency signal into second representative signals of information during transmission of the carriers, will be now given in connection with the same FIG. 2a in the framework of a first advantageous non-restrictive embodiment mode.

This embodiment mode will be described in the case where, as an example, the LC-LV coupling module 1 delivers the first representative signals of the information during reception of the carriers rcp to the low voltage half duplex in the form of a first, then a second distinct central low frequency signal, i.e. the signals at the frequency of 61 kHz and 74 kHz respectively, as previously mentioned in the description.

As will be observed in the aforementioned FIG. 2a, the first transformation module 10 of the first representative signals of the information during reception of the carriers rcp can comprise to advantage a first 101 and second 102 reception pass-band filter circuit. These filter circuits are connected in parallel and each centered on the central frequency of the first and the second low frequency signal respectively, i.e. on the 61 kHz and 74 kHz frequency.

A frequency transposition circuit 103 during reception is provided, connected in cascade with the previously quoted parallel connected filter circuits 101 and 102; this circuit 103 enabling the first intermediate frequency fit to be delivered. In a non-restrictive embodiment mode, it is indicated that the frequency transposition circuit 103 during reception delivers in fact the first intermediate frequency signal fir through an amplifier circuit 104 enabling the level of the first intermediate frequency signal $fi_1$ to be adjusted.

Moreover, as shown in the same aforementioned FIG. 2a, the second transformation module 21 of the second intermediate frequency signal $fi_2$ comprises to advantage, in the embodiment mode shown in FIG. 2a, a frequency transposition circuit 211 during transmission, this frequency transposition circuit during transmission being connected to the second frequency transposition module 20 of the reception radio frequency signal srfr in order to thus receive the second intermediate frequency signal $fi_2$. The frequency transposition circuit 211 during transmission delivers thus, from the second intermediate frequency signal $fi_2$, a second transposed intermediate frequency signal, marked tfi2 in FIG. 2a. In an advantageously effective embodiment mode, it is indicated however that the frequency transposition circuit 211 during transmission receives the second intermediate frequency signal $fi_2$ through an amplifier 210, which indeed allows the amplifier 104 of the first channel, in an analogous way, to adjust the level of the second intermediate frequency signal $fi_2$ effectively delivered to the frequency transposition circuit during transmission 211.

The frequency transmission circuit during transmission 211 is itself followed, as shown in FIG. 2a, by a first 212 and second 213 transmission pass-band filter circuit, these filter circuits being connected in parallel in an analogous manner with filters 101 and 102 of the first channel and each centered on one or other of the central frequencies of the first and second low frequency signal at respectively 61 kHz and 74 kHz. The first 212 and the second 213 transmission pass-band filter circuit delivers then the second representative signals of information during transmission of carriers ecp, these signals being centered on one or other of the aforementioned central frequencies and delivered to the LC-LV coupling module 1 through an amplifier 214 for example.

In the framework of the description of the constituent components of respectively the first and second channels, it is indicated that the amplifiers such as amplifier 104, 210 and 214 have the function, on the one hand, of ensuring an adequate amplification of the transmitted signals and, on the other hand, of ensuring a de-coupling and separation of the different stages complying with the standard ideas in the technique of frequency change.

With regard to the frequency transposition circuit during reception 103 and the frequency transposition circuit during transmission 211, it is indicated, according to a particularly advantageous embodiment mode of the interface device which is the object of the present invention, that these circuits each comprise a frequency alteration circuit respectively 1030 and 2110, and that they comprise moreover a common oscillator carrying the reference 4 in FIG. 2a.

For reasons of embodiment convenience, on the one hand, and frequency stability of the different signals obtained by frequency alteration previously mentioned in the description, it is indicated also, on the other hand, that the first frequency transposition module 11 of the first intermediate frequency $fi_1$ and the second frequency transposition module 20 of the radio frequency reception signal srfr previously mentioned in the description are conceived and organized according to an architecture similar to that of the transformation module 10 of the first representative signals of the information during reception of the carriers and the transformation module 21 of the second intermediate frequency signal $fi_2$ into the aforementioned second representative signals of information during transmission of the carriers ecp.

Consequently, as will be observed in the aforementioned FIG. 2a, it is indicated that the first frequency transposition module 11 of the first intermediate frequency signal $fi_1$ into a radio frequency transmission modulation signal comprises to advantage a frequency transposition circuit 110 receiving the first intermediate frequency signal $fi_1$ and delivering, for example through an amplifier 111, the radio frequency modulation signal sme previously quoted in the description.

In the same way, the second frequency transposition module 20 of the reception radio frequency signal srfr into a second intermediate frequency signal fi$_2$ comprises to advantage a frequency transposition circuit 201 receiving the reception radio frequency signal srfr through an amplifier 200 for example and delivering the previously mentioned second intermediate frequency signal fi$_2$.

In the same way as in the case of frequency transposition circuits 103 and 211, it is indicated that the frequency transposition circuits 110 and 201 comprise respectively a frequency alteration circuit, carrying the references 1110 and 2010 respectively as well as a common local oscillator, carrying the reference 5, delivering the same frequency alteration signal to the frequency alteration circuits specifically called 1110 and 2010.

Lastly, it will be indicated, as shown in FIG. 2a, that the coupling circuit 2 of the first channel I and the second channel II is interconnected to a transmission-reception antenna 3, which enables transmitting and receiving respectively the radio frequency transmission signal and the radio frequency reception signal marked srf(er). The coupling circuit 2 can be made in the form of a so-called magic T type of circuit.

With regard to the operating mode of the interface device such as shown in FIG. 2a, it is indicated that such a device allows an almost total transparency with regard to the information conveyed by the carriers. This transparency quality allows a real time transmission of every frame conveyed by the carriers to be obtained as will be described later in the description.

The interface device which is the object of the present invention thus allows, by means of a choice and a use of adapted frequency alteration, the transformation of the low frequency signals obtained by SFSK modulation on the LC-LV signal carriers into a UHF band of 433 MHz for example. In a specific embodiment mode, the first and second intermediate frequency signal had the frequency value: fi$_1$=fi$_2$=20.4 MHz.

The interface device as shown in FIG. 2a gives satisfaction. In particular, the choice and the use of common local oscillators 4 and 5, when the interface device the object of the present invention includes two frequency alteration stages, both on the reception channel, the first channel, and on the transmission channel, the second channel, allows a satisfactory frequency stability to be obtained, while the commutation time, i.e. the establishment time of the carrier in the reception direction of the LC/radio transmission carriers and the radio carrier/LC establishment time during transmission, can be made much smaller than a bit duration, i.e. at 1/500 of a second.

For signals for which the bandwidth is of the order of 4 kHz around the central frequencies, i.e. the aforementioned 61 kHz and 74 kHz values, the establishment time is of the order of 250 µs.

It is recalled that the transparency character of the interface device the object of the present invention with regard to the transmitted information, allows itself to be freed from all the encoding problems specific to radio transmission.

In the first embodiment mode of the interface device the object of the present invention as described in FIG. 2a, it is indicated that this embodiment mode has been described with two stages of frequency alteration per channel, first channel and second channel, but that however, the number of frequency alteration stages can be greater without damaging in any way the transparency character sought as regards transmitted data. When the number of frequency alteration stages is equal to two in each of the channels, aforementioned first and second channel, it is indicated as a non-restrictive example that when the transmission or reception radio frequency signal corresponds to a carrier frequency of 433 MHz, the common value for the first intermediate frequency signal fi$_1$ and the second intermediate frequency signal fi$_2$ can be taken equal to the aforementioned 20.4 MHz value.

Lastly, it will be understood, with regard to the first embodiment mode shown in FIG. 2a, that the use of common local oscillators 4 and 5 for the frequency alteration stages of the first channel and of the second channel, allows the stability problem of the local oscillators in the framework of the frequency alteration operations to be resolved in a satisfactory way insofar as the stabilization is thus simplified in a practical manner. Indeed, for a stability of the order of 1% of the oscillation frequency delivered by the aforementioned local oscillators, an overall satisfactory functioning of the whole is obtained, while the standard devices allowing stabilization of the oscillation frequency of these oscillators can be relatively reduced in this way because of the common character of these oscillators for the first and second channels respectively.

A second embodiment mode of the interface device the object of the present invention, will now be described in connection with FIG. 2b. In this embodiment mode, the different signals carry the same designations as in the case of the first embodiment mode described in connection with FIG. 2a, insofar as these signals have similar functions to those of the aforementioned figure. However, these different signals carry references in capital letters because of the fact that, although having the same function or a similar function as that of the signals of FIG. 2a, their value or their structure can be different.

The second embodiment mode, according to FIG. 2b, is now described in the case where the LC-LC coupling module 1 delivers the first representative signals of the data during reception of the low voltage duplex carriers RCP in the form of a first, then a second logic signal with two complemented values. It is understood just as the first representative data signals during reception of the carriers RCP correspond in fact to the low frequency 61 kHz and 74 kHz signals previously mentioned in the description, after detection for example and put into the form to deliver logic signals with aforementioned complemented values. The corresponding detection processing and putting into form will not be described in detail because it corresponds to a standard type of processing perfectly understood by the professional.

The first channel I and the second channel II playing the same role in the second embodiment mode, it is indicated, as shown in FIG. 2b, that the first transformation module 10 comprises a sub-carrier wave generator circuit 105, this circuit being constituted for example by a local oscillator delivering a sub-carrier wave at 4 kHz for example, and an amplitude modulation circuit 106, receiving, on the one hand, the sub-carrier wave delivered by the generator circuit 105 and, on the other hand, the first representative signals of the data during reception of the RCP carriers previously quoted in the description. The amplitude modulator circuit 106 then delivers an amplitude modulated reception sub-carrier wave, for example through an amplifier 104, this amplitude modulated sub-carrier wave playing the role of the first intermediate frequency signal fi$_1$ and carrying for this reason the reference FI$_1$.

In the same way, the second transformation module 21 of the second intermediate frequency FI$_2$ comprises to advantage an amplitude demodulator circuit 215 receiving the second intermediate frequency signal $FI_2$, which corresponds to a transmission modulated sub-carrier wave, the demodulator circuit 215 delivering a transmission amplitude demodulated sub-carrier wave, marked $DFI_2$. The amplitude demodulator circuit 215 is followed by a circuit 216 for putting into receiving form the transmission amplitude demodulated sub-carrier wave $DFI_2$ and delivering to the LC-LV coupling module 1 the second representative signals of the low voltage half duplex carriers, signals marked ECP, in the form of a logic signal with two complemented values for the retransmission of the information received by radio frequency channel in the form of carriers on the LV network.

With regard to the first frequency transposition module 11 and the second frequency transposition module 20 of the first I and second II channel, it is indicated that these modules can be identical to those of the first embodiment mode shown in FIG. 2a and consequently, the constituent components of these latter carry the same reference.

With regard to the second embodiment mode of the interface device, the object of the present invention, it is indicated that it has the advantage of using standard equipment normally available in the store. It is indicated moreover that the amplitude modulated sub-carrier wave $FI_1$ and the second intermediate frequency signal $FI_2$ have the same frequency value, i.e. 4 kHz, because of the common local oscillator structure 5 in the first and in the second channel. Consequently, the demodulator AM 215 can be constituted by any detection or peak limiting device constituting in fact the frequency low pass filter with a cutting frequency of the order of 2 kHz for example, which allows a corresponding detected signal to be delivered to the envelope of the second intermediate frequency signal $FI_2$, this detected signal being no other than the constituent signal of the transmission demodulated sub-carrier wave $DFI_2$.

With regard to the forming circuit 216, it is simply indicated that this, from the transmission demodulated sub-carrier wave $DFI_2$, can consist of a set of flip flops having a suitable absence of bouncing in order to ensure the transmission of the second representative signals of the low voltage duplex carriers ECP in the form of the aforementioned logic signal with two complemented values.

In a simplified embodiment of the second embodiment mode such as shown in FIG. 2c, the first frequency transposition module 11 and the second frequency transposition module 20 can be replaced by a frequency modulation transmitter 110-E, respectively a frequency modulation receiver 201-R, the common local oscillator 5 being removed. The FM transmitter 110-E receives the signal $FI_2$ as a frequency modulation signal and the receiver 201-R delivers the signal $FI_2$ from the FM reception. This simplified embodiment mode allows the frequency stability problems to be completely freed due to the fact of the removal of the common local oscillator.

From the point of view of the general functioning of the interface device, the object of the present invention, it is indicated that, both in the first mode and in the second embodiment mode shown in FIGS. 2a, 2b and 2c, these embodiment modes can operate from a management of the transmission commutation of the radio frequency signal srfe with the radio frequency reception signal srfr, and reciprocally, from the LC-LV coupling module 1 previously described in the framework of the two aforementioned embodiment modes. It is understood in particular that from a mode, so-called waking mode, in which no carrier is present on the LV network while, moreover, no radio frequency signal srfr is present at the receiver, the interface device the object of the present invention is then in a similar situation to a waking state. The presence of carriers on the LV network, respectively the presence of a reception radio frequency signal srfr and second representative signals of information during transmission of the carriers, ecp signals in the case of the first embodiment mode, ECP signals in the case of the second embodiment mode, allow the LC-LV coupling module1 to manage the passage from one state to the other on the criterion of first appearance on one or other of the signals.

Figure 3A:
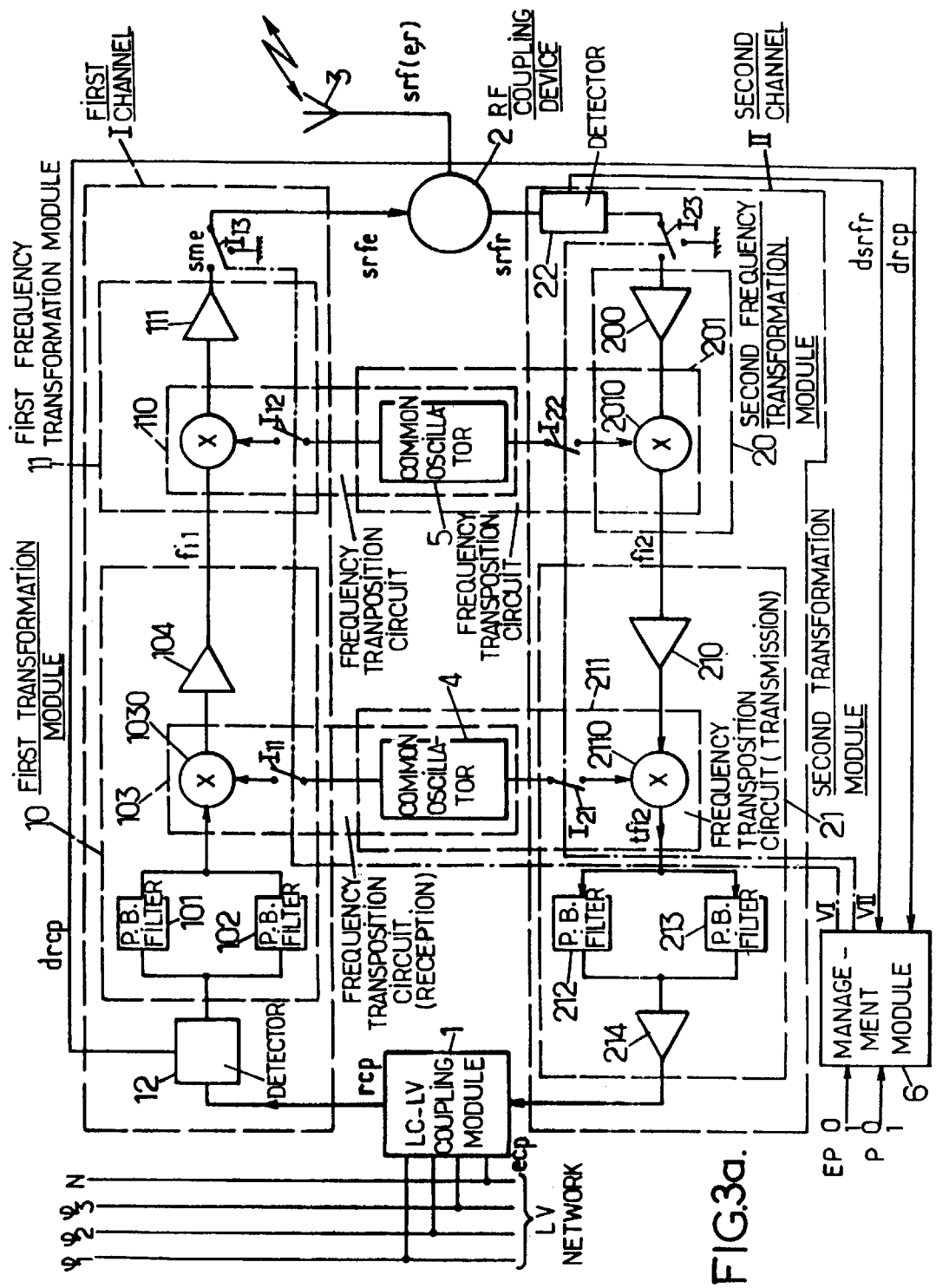
FIG. 3a shows an interface device according to the first embodiment mode shown in FIG. 2a, in an embodiment variant in which this device is configurable.
Figure 3B:
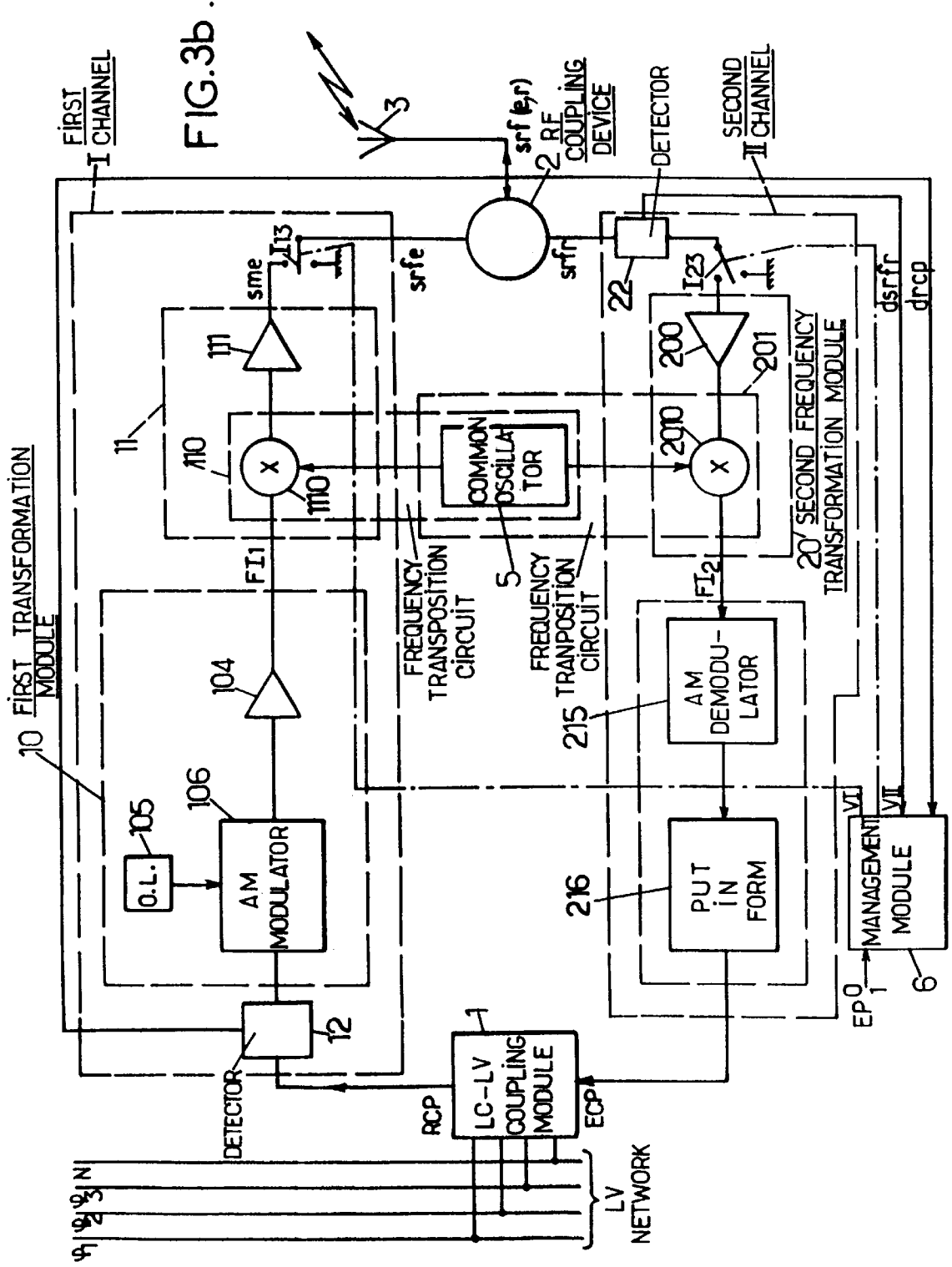

However, this operating mode has drawbacks such as a loss of obvious flexibility as well as a risk of locking or saturation of the interface device the object of the present invention. In order to remedy the aforementioned drawback, it is understood, as shown in FIGS. 3a and 3b relative to the first. respectively to the second embodiment mode of the interface device object of the present invention, that the latter can favorably comprise a management module 6 of the first I and the second II channel, this management module allowing in fact the commutation of one or other of the aforementioned channels between a waking state corresponding to the previously described state in the description to be ensured, a reception state and a radio transmission state, as will be described below in connection with FIGS. 3a and 3b. It is understood in particular that this management module 6 allows a configuration or a particularly flexible programming adapted to the interface device, object of the present invention, among the different possible states of this be ensured.

As it has been shown in particular in FIG. 3a relative to the first embodiment mode, in this case, there can be provided, at the first channel I, a detector circuit 12 of the first representative signals of information during reception of the carriers rcp, this detector circuit 12 delivering a corresponding detection signal, designated by the signal drcp.

In the same way, the second channel II comprises a detection circuit 22 of the radio frequency reception signal srfr. This detection circuit 22 delivers a corresponding detection signal, designated by signal dsrfr. The detection signals dsrfr and drcp are then delivered to the previously mentioned management module 6.

As it has moreover been shown in the same FIG. 3a, control and controlling circuits of the first and second channels I, II, can then be provided, these circuits being shown for the first channel I by interrupters $I_{11}$, $I_{12}$ and $I_{13}$ and for the second channel II, $I_{23}$, $I_{22}$ and $I_{21}$. The interrupters $I_{11}$, and $I_{22}$ can to advantage be mounted on the channels delivering the local oscillation signal delivered by the local oscillator 4 to the frequency alteration circuits 1030 and 2110 respectively, the interrupters $I_{12}$ and $I_{22}$ can to advantage be mounted on the channels delivering the local oscillation signals from the local oscillator 5 to the frequency alteration circuits 1110 and 2010 respectively, and the interrupter circuits $I_{13}$ and $I_{23}$ can be to advantage commutation mounted in the first channel I at input of the transmission radio frequency signal srfe of the coupling circuit 2, and at the output of the reception radio frequency signal srfr of the coupling circuit 2 respectively. As shown in figure the aforementioned FIG. 3a, the interrupter $I_{13}$ can to advantage be commutation controlled between the output of the amplifier 111, i.e. in fact the output of the first channel I, and the reference voltage of the device, while the interrupter $I_{23}$ can be commutation controlled between the input of the amplifier 200, i.e. the input of the second channel II and the reference voltage of the device. Indeed the aforementioned interrupters are shown in the form of electromechanical interrupters for the comprehension of the corresponding functions, it is understood that these different interrupters can to advantage be made by controlled electronic interrupters. The control of the aforementioned interrupters can then to advantage be made from the management module 6 to ensure the control and controlling of the first channel I and the second channel II respectively. With this object, the management module 6 can to advantage receive two binary variables, so-called programming or configuration, the variables Ep and P respectively, each likely to occupy two binary values 0 or 1.

The truth table of the aforementioned binary variables is given according to the first table:

|   | EP | |
|---|----|----|
| P | 1  | 0  |
| 1 | 11 | 10 |
| 0 | 01 | 00 | and the control of the interrupters $I_{11}$, $I_{12}$, $I_{13}$ respectively $I_{21}$, $I_{22}$, $I_{23}$ can be made according to the truth table below:

|                                      | First channel I                                                                  | Second channel II                                                              |
|--------------------------------------|----------------------------------------------------------------------------------|--------------------------------------------------------------------------------|
| 00<br>Waking Mode                    | $I_{11}$)<br>$I_{12}$) open<br>$I_{13}$)<br>drcp = 0<br>Radio transmitter 0      | $L_{21}$)<br>$L_{22}$) open<br>$L_{23}$)<br>dsrfr = 0<br>Radio receiver 1      |
| 10<br>radio reception<br>Mode        | $I_{11}$)<br>$I_{12}$) open<br>$I_{13}$)<br>drcp = 0<br>Radio transmitter 0      | $I_{21}$)<br>$I_{22}$) closed<br>$I_{23}$)<br>dsrfr = 0<br>Radio receiver 1    |
| 11<br>radio transmission<br>mode     | $I_{11}$)<br>$I_{12}$) closed<br>$I_{13}$)<br>drcp = 1<br>Radio transmitter 1    | $I_{21}$)<br>$I_{22}$) open<br>$I_{23}$)<br>dsrfr = 0<br>Radio receiver 1      |
| 01<br>Priority mode<br>for radio reception | $I_{11}$)<br>$I_{12}$) open<br>$I_{13}$)<br>while<br>drcp < S                | $I_{21}$)<br>$I_{22}$) closed<br>$I_{23}$)<br><br>dsrfr = 1                    |

In the two aforementioned tables, it is indicated that as a function of the value of the binary variables EP and P, it is possible to reach four significant states of the interface device the object of the present invention, a first, so called absolute waking state, obtained for the value 00 of the combination of the variables EP and P, this absolute waking state corresponding in fact to the waking state previously mentioned in the description during the absence of the radio signal srfr and the absence of the carrier signal rcp. The corresponding states of the aforementioned interrupters as well as the logic value of the detection signals dsrfr and drcp are given in the second truth table previously introduced in the description.

The combination value 10 of the variables EP and P corresponds to a radio reception mode for which there exists an srfr signal in the absence of reception of carrier signals, the drcp signal being at the value 0. The state of the corresponding interrupters is given in the second truth table.

The combination of the binary values EP and P at the value 11 corresponds to a transmission mode during a duration corresponding to at least one frame by radio transmission, the drcp signal is equal to 1 and the interrupters of the first channel I are then closed in order to ensure the transmission function. The corresponding states of the second channel II are also given in the second truth table.

For the value 01 of the combination of the variable EP and P, according to a particularly advantageous aspect of the interface device the object of the present invention, this can then be configured in a so-called priority mode in which the radio reception is in fact privileged, taking account of the difference of the sensibility thresholds between the radio receiver and the LC-LV coupling module 1 to their respective signals. It is understood as in the previously defined radio reception priority mode, the drcp signal, the detection signal of the carriers during reception, can then be taken in its analogue value compared with a threshold value S, the interrupters $I_{11}$, $I_{12}$, $I_{23}$ of the first channel I being then held open while the amplitude value of the drcp signal is less than this specified threshold value, the interrupters $I_{21}$, $I_{22}$, $I_{23}$ being then held closed and the dsrfr signal held at the arbitrary value 1.

It is understood in particular that taking account of the different modes, waking mode, radio reception mode, radio transmission mode and radio reception priority mode, the dcrcp and dsrfr signals can then be combined at the level of the commutation module 6 with the logic signals EP and P to deliver the control signals V1 and V2 symbolized by the electromechanical controls in FIGS. 3a and 3b, to control the appropriate opening and/or closing of the interrupters $I_{11}$, $I_{12}$, $I_{13}$ of the first channel I and $I_{21}$, $I_{22}$, $I_{23}$ of the second channel II respectively.

It is the same for the embodiment mode of FIG. 3b.

A more detailed description of an operating mode and a utilization mode of all interface devices for a low voltage/radio frequency carrier connection on a specific low voltage network will now be given in connection with FIG. 4 and FIGS. 5a to 5e.

Figure 4:
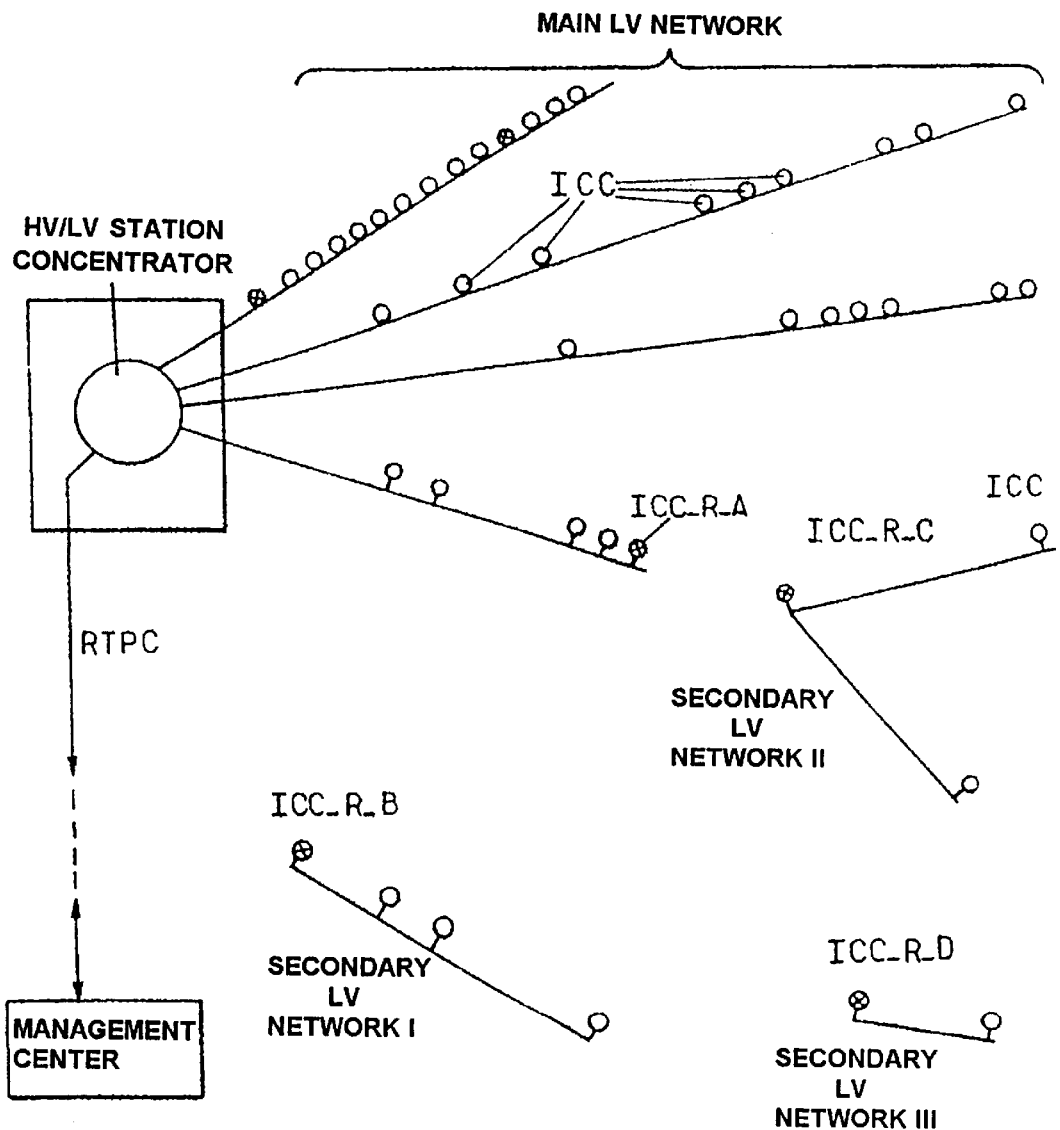
FIG. 4 shows, as an illustrative example, a low voltage electrical energy distribution network, comprising different hamlet distribution network sections, equipped with interface devices according to the object of the present invention.

In the aforementioned FIG. 4, a LV distribution network has been shown including a main network interconnected to a HV/LV station provided with a concentrator connected through a commuted public telephone network RTPC to a management center. The LV distribution network is well known to include a main network constituted from four branches directly interconnected to the HV/LV station and for example three secondary LV networks, marked I, II, and III, these secondary LV networks being able to consist of isolated hamlet networks for example. By definition, these secondary networks are not interconnected to the HV/LV station provided with the concentrator shown in FIG. 4, but are on the contrary interconnected to other HV/LV stations not shown because not provided with concentrators by definition. The branches of the main LV network each have a length of the order of 1000 meters at the maximum. They are equipped with a certain number of I.C.C. circuits and the concentrator transmits to these I.C.C. circuits data frames at a rate of 300 bits per second by operating in half duplex, as previously mentioned in the description.

Thus as it has been shown moreover in FIG. 4, the lower branch of the main LV network is moreover provided with an interface device according to the object of the present invention, this interface device being marked for convenience I.C.C-R-A and being indeed provided with a bi-directional radio interface function.

It is the same regarding the secondary LV network I, provided with an interface device marked I.C.C-R-B, and the secondary LV network II itself provided with an interface device marked I.C.C-R-C. A third LV secondary network III is itself provided with an interface device marked I.C.C-R-D. Each interface device of the secondary LV networks is in direct sight of the interface device of the main network. With this object, each interface device can then be provided with a Yagui type of antenna constituting the antenna 3 shown in the embodiment modes previously described. For a transmission frequency of 433 MHz, the power of the radio transmitters enabling the transmission of the srfe signal does not exceed 0.1 watt. The transmission-reception antenna of the interface device I.C.C-R-A of the main LV network can on the contrary have omni-directionality qualities. The I.C.C. circuits are represented by a hollow circle and the interface devices I.C.C-R-A, B, C and D are represented by a circle with a cross. In a general way the aforementioned interface devices, according to the object of the present invention, are mounted for example on a support post of the conductors of the corresponding LV electrical network.

The transmission of the messages or data frames is carried out according to the process previously described by the description from the concentrator on the main LV network with wave repetition according to the transmission credit process previously described. At the time the aforementioned frames reach the lower branch of the main LV network of the interface device I.C.C-R-A, object of the present invention, this transmitting practically in synchronism, i.e. with the duration of commutation close to one or other channel, in radio message form, the corresponding frame to the interfaces of the secondary LV networks I.C.C-R-B-C-D respectively.

A more detailed description of the development of the transmission process of the aforementioned frames, these frames having a duration of the order of one second, will be given in connection with FIGS. 5a to 5d and 5e, in which, in order not to overload the drawing, the upper branch of the main LV network has been removed.

Figure 5C:
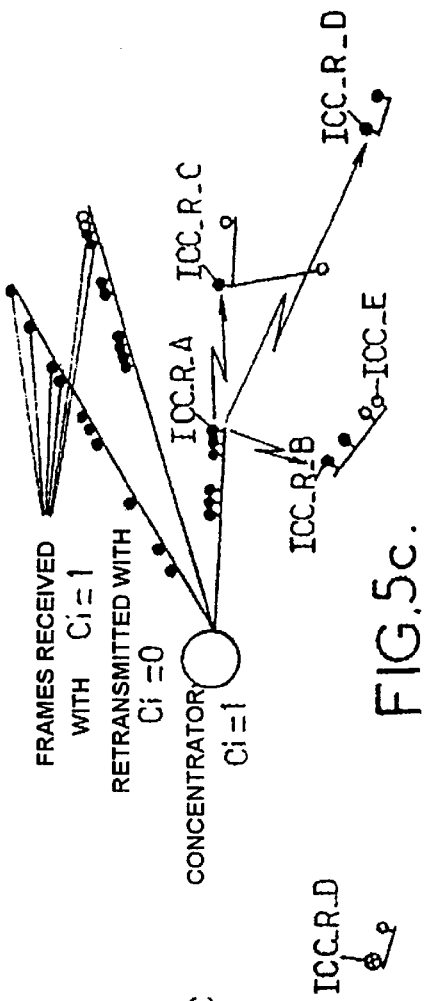
FIGS. 5a to 5d show different states of the network shown in FIG. 4 during the successive transmission, in waves, of messages by credit repetition.
Figure 5D:
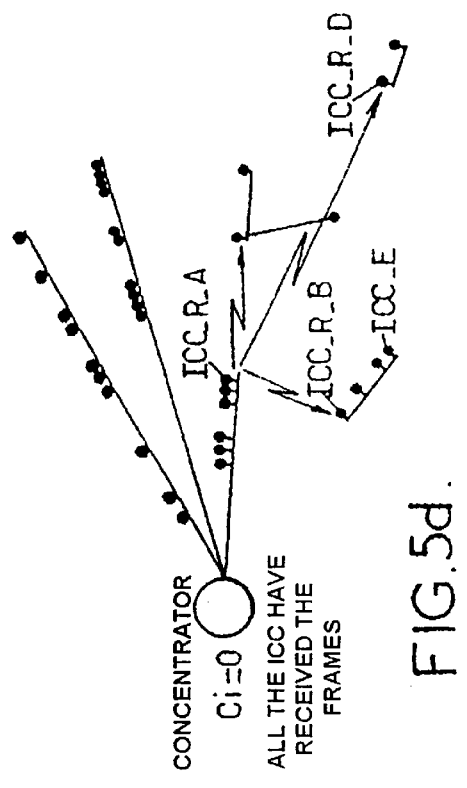
Figure 5A:
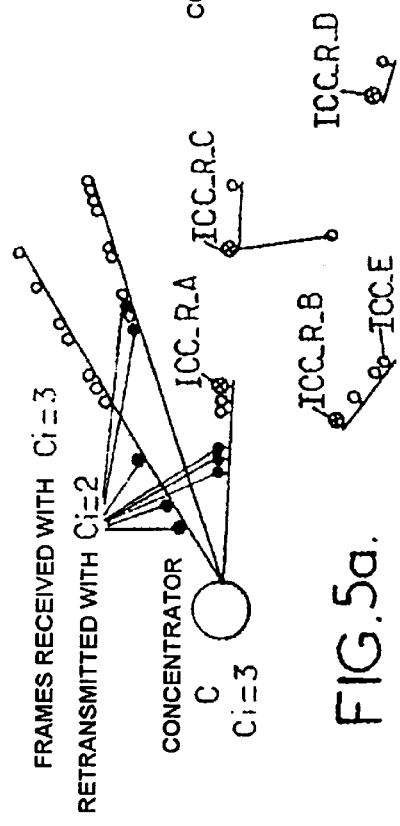

In FIG. 5a, the concentrator of the HV/LV station carries out the initial transmission of a data frame with a credit $C_i=3$. The I.C.C interfaces represented by blackened circles, of the main LV network receive correctly the aforesaid frame with a corresponding credit. The aforementioned I.C.C. interfaces retransmit this frame with a decrementation of the credit value, i.e. with credit $C_i=2$.

Figure 5B:
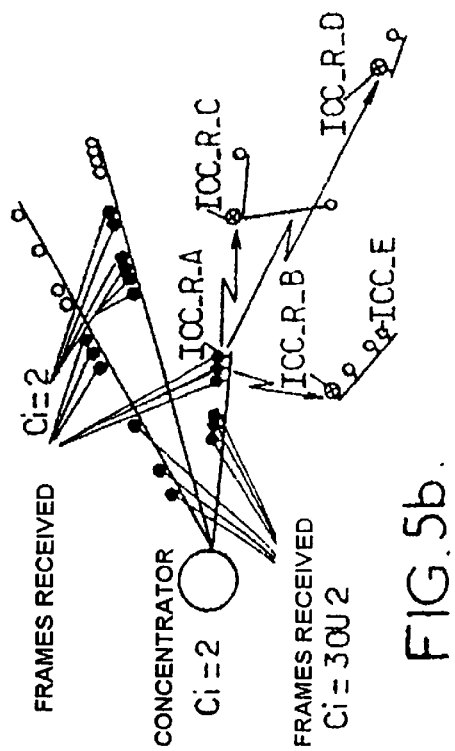

FIG. 5b shows, following the transmission of the aforesaid frame with credit value $C_i=2$, the state of all the I.C.C. interfaces which have received the aforementioned frame with a credit repetition equal to 3 or 2. All the I.C.C. interfaces which have received the aforementioned frame with credit repetition=3 or 2 retransmit synchronously with a decrementation of the credit value $c_i=1$. At the stage of FIG. 5b, the I.C.C-R-A interface device of the main LV network is supposed to have received the frame carrying along a credit repetition=2. From the reception of this frame, the interface device according to the object of the present invention I.C.C-R-A retransmits at the time of commutation close to the channels through the radio transmission, the messages or corresponding frames to the interface devices according to the invention placed on the secondary LV networks.

The transmission is carried out with a credit repetition restored to the value 1.

In FIG. 5c has been shown all the I.C.C interfaces having received the aforementioned frame with credit repetition with the value 1; the frame is then repeated on all the main LV network and the secondary LV networks after decrementation to the value 0.

Lastly, in FIG. 5d, all the I.C.C. interfaces and the interface circuits I.C.C-R-A, B, C, D, are supposed to have received the aforementioned message frame.

Figure 5E:
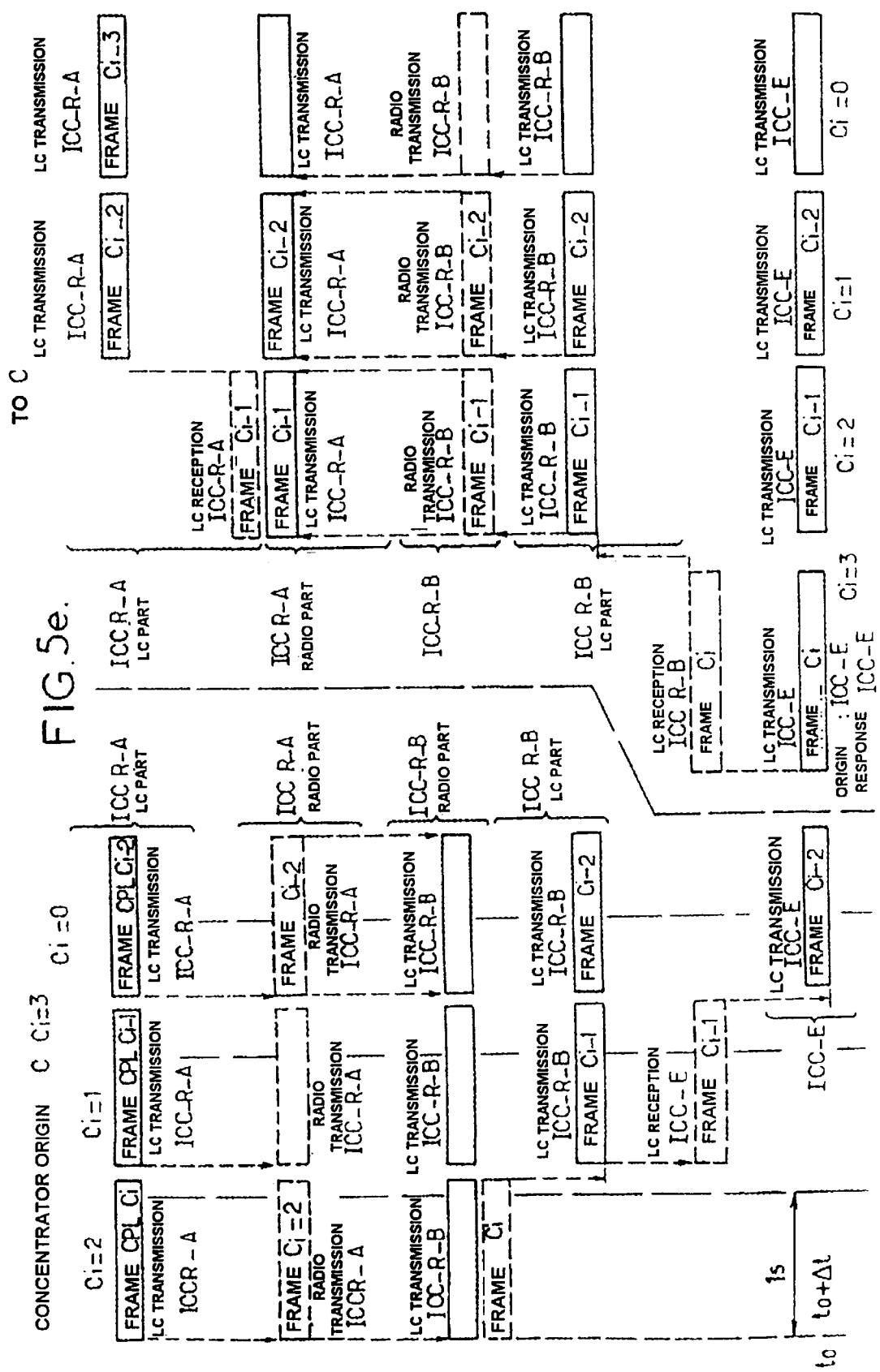
FIG. 5e shows a general flow chart of the frames or messages transmitted on the network shown in FIG. 4 during the successive stages shown in FIGS. 5a to 5d.

In FIG. 5e, a flowchart of the transmission and repetition with a credit repetition of all the aforementioned frames has been shown in the case of the LV distribution network shown in FIGS. 4 and 5a to 5d.

The response of the I.C.C. marked E on the secondary LV network I is also shown in FIG. 5e.

In connection with FIGS. 4 and 5a to 5e, it is understood that the interface device the object of the present invention can be used to ensure the transmission in interactive mode on the low voltage electrical energy distribution network of several management messages of services between a management center and several subscribed client installations with these services when these installations are simply interconnected to the low voltage electrical energy distribution network.

The interface device the object of the present invention has a very large flexibility of use, because it is sufficient, to ensure the transmission of the aforementioned management messages of services, that the continuous or discontinuous branches of the electrical energy distribution network such as illustrated in the previously mentioned figures comprise at least one interface device according to the invention, each subscriber being able simply to be equipped with an I.C.C. interface previously mentioned in the description. In such a case, each interface device according to the invention is in radio connection with another interface device of the same branch or of a separate branch, and allows the synchronous transmission of the data and information conveyed by the LC-LV low voltage carriers on each constituent branch of the network to be ensured.

Moreover, indeed, for a low voltage electrical energy distribution network branch with high density subscribed installations, it is possible to provide two interface devices according to the object of the present invention, in radio connection so that the devices constitute a by-pass in pairs which enables a direct transmission of the aforementioned management messages to be ensured. Such a use is shown on the upper branch of the main LV network of FIG. 4.

An interface device for a bi-directional low voltage/radio frequency LC-LV carrier connection has thus been described particularly performing insofar as, on the one hand, the transparency of encoding of data or information carried by the management messages or frames allow it to be freed from all the problems of specific encoding of the radio transmission, and where, on the other hand, the synchronization of the transmission of the aforementioned frames is globally preserved, whatever is the configuration of the LV distribution network in the main network and in the hamlets' networks.

Moreover, while the transmission rate of messages by carriers is currently limited to 300 bits per second, the passage to a rate of 600 bits per second is however conceived and the interface device the object of the present invention brings no limitation to such a rate increase.

Moreover, because of the flexibility of use of the interface devices the objects of the present invention, it is indicated that these allow an automated management of every subscribed inhabitant in the isolated hamlets to be ensured and to ensure a simplification of the management of the transmission of messages by carriers, insofar as, for the LV networks with high density of I.C.C. circuits, the positioning of several interface devices according to the object of the present invention allow the alleviation the transmission process by waves with credit repetition .

Moreover, it is indicated that the use of the interface device, the object of the present invention, can be carried out so as to make this device easily assimilated with a passive component for the manager of the network, such a passive component not necessitating any intervention on the part of this latter during long periods of running.

I claim:

1. An interface device for a bi-directional low voltage/radio frequency carrier LC-LV connection between a low voltage electrical energy distribution line, allowing the transmission of signals by carriers, and radio space, characterized in that this comprises:

LC-LV coupling means interconnected to said low voltage line and allowing to deliver, during reception of the first representative signals of information during reception of said carriers:

a first low voltage/radio frequency carrier channel comprising at least:

first transformation means of said first representative signals of information during reception of said carriers into a first intermediate frequency signal amplitude modulated by said first representative signals of information during reception of said carriers;

first frequency transposition means of said first intermediate frequency signal into a radio frequency transmission modulation signal;

a coupling and radio frequency transmission-reception device interconnected to said first frequency transformation means and receiving on the one hand, during transmission, said radio frequency transmission modulation signal to carry out the transmission of a representative radio frequency signal of the information of said carriers, and, on the other hand, during reception, a radio frequency reception signal, said interface device including moreover, interconnected to said coupling and transmission-reception device;

a second radio frequency/low voltage carrier channel receiving said radio frequency reception signal and including at least:

second frequency transposition means of said radio frequency reception signal into a second intermediate frequency signal of the same frequency as that of the first intermediate frequency signal;

second transformation means of the second intermediate frequency signal into second representative signals of information during transmission of said carriers, said second transformation means being interconnected and delivering said second representative signals of information during transmission of said carriers to said LC-LV coupling means, for transmission of this information in the form of carriers on the low voltage line.

2. A device according to claim 1, characterized in that said LC-LV coupling means delivering said first representative signals of information during reception of said low voltage half duplex carriers in the form of a first then a second low frequency signal of distinct central frequency, said first transformation means of said first representative signals of information during reception of said carriers comprise:

a first and a second reception pass band filter circuit, connected in parallel and each centered on the central frequency of the first and the second low frequency signal respectively:

frequency transposition means during reception connected to said first and second reception pass band filter circuit and delivering said first intermediate frequency signal, and in that said second transformation means of the second intermediate frequency signal comprises:

means of frequency transposition during transmission, connected to said second frequency transposition means of the reception radio frequency signal, receiving said intermediate frequency signal, and delivering a second transposed intermediate frequency signal, a first and a second transmission pass band filter circuit connected in parallel and each centered on respectively the one and the other central frequency of respectively the first and second low frequency signal and delivering said second representative signals of information during transmission of said carriers centered on respectively the one and the other of the said central frequencies to the LC-LV coupling means.

3. A device according to claim 1, characterized in that the frequency transposition means during reception, the frequency transposition means during transmission, on the one hand, and the first and second frequency transposition means, on the other hand, each comprise:

a frequency change circuit, and a common local oscillator.

4. A device according to claim 1, characterized in that said LC-LV coupling means delivering said first representative signals of the information during reception of said low voltage half duplex carriers in the form of a logic signal with two complemented values, said first transformation means comprise:

generator means of a sub-carrier wave, amplitude modulation means receiving, on the one hand, said sub-carrier wave, and, on the other hand, said representative signals of the information during reception of said carriers and delivering an amplitude modulated reception sub-carrier wave, playing the role of said first intermediate frequency signal, and in that said second transformation means comprise:

amplitude demodulation means receiving said second intermediate frequency signal corresponding to a transmission amplitude modulated sub-carrier wave and delivering a transmission amplitude demodulated sub-carrier wave;

a forming circuit receiving the transmission amplitude demodulated sub-carrier wave and delivering, to said LC-LV coupling means, said second representative signals of said low voltage half-duplex carriers in the form of a logic signal with two complemented values.

5. A device according to one of the claim 1, characterized in that this comprises moreover a management module of the first and the second channel, said management module allowing the commutation of one or other of said channels, between at least one waking state, a reception state and a radio transmission state to be ensured.

6. A device according to claim 5, characterized in that said management module allows moreover the commutation of one or other channel between a waking state and a transmission priority state to be ensured, which allows said device among a set of devices to be programmed according to the considered application.

7. The use of a device according to one of the claim 1, to ensure transmission, in interactive mode, over a low voltage electrical energy distribution network, of several management service messages between a management center and several client installations subscribed to these services, these installations being interconnected to the low voltage electrical energy distribution network.

8. The use according to claim 7, characterized in that the low voltage electrical energy distribution network being subdivided in to continuous or discontinuous branches, each branch comprises at least one interface device in radio connection with another interface device of the same branch/ or a separate branch, two interface devices in radio connection allowing the transmission of data and information conveyed by said low voltage LC-LV carriers in synchronism on each constituent branch of said network to be ensured.

9. The use according to one of the claim 7, characterized in that, for a low voltage electrical energy distribution network branch with a high density of subscribed installations, said branch comprises at least two interface devices in radio connection, said interface devices constituting two by two a by-pass allowing a direct transmission of said management messages to be ensured.

* * * * *